United States Patent [19]
Shimono

[11] Patent Number: 6,010,062
[45] Date of Patent: Jan. 4, 2000

[54] HEAT INSULATED VESSEL AND A METHOD OF PRODUCING THE SAME

[75] Inventor: Toshiaki Shimono, Seki, Japan

[73] Assignee: Athena Kogyo Co., Ltd., Seki, Japan

[21] Appl. No.: 08/809,415

[22] PCT Filed: Mar. 15, 1996

[86] PCT No.: PCT/JP96/00710

§ 371 Date: Apr. 25, 1997

§ 102(e) Date: Apr. 25, 1997

[87] PCT Pub. No.: WO97/34817

PCT Pub. Date: Sep. 25, 1997

[51] Int. Cl.[7] .................. B65D 1/40; B29C 53/34
[52] U.S. Cl. ................ 229/400; 229/4.5; 264/291; 264/321; 264/550
[58] Field of Search .............. 229/4.5, 400, 403, 229/406; 220/657, 659, 902; 264/48, 291, 321, 550; 493/114, 154, 158

[56] References Cited

U.S. PATENT DOCUMENTS

| | | | |
|---|---|---|---|
| 3,260,781 | 7/1966 | Lux et al. | 264/321 |
| 3,468,467 | 9/1969 | Amberg | 229/403 |
| 3,531,555 | 9/1970 | Tiffin et al. | 229/400 |
| 4,197,948 | 4/1980 | Amberg et al. | 229/400 |
| 4,279,585 | 7/1981 | Arndt et al. | 264/296 |
| 4,281,979 | 8/1981 | Doherty et al. | 264/321 |
| 4,359,160 | 11/1982 | Myers et al. | 229/400 |
| 5,062,568 | 11/1991 | Hill et al. | 229/403 |
| 5,176,607 | 1/1993 | Hill et al. | 493/114 |

FOREIGN PATENT DOCUMENTS 49-67882  6/1974  Japan.
51-10104  1/1976  Japan.

Primary Examiner—Gary E. Elkins
Attorney, Agent, or Firm—Jones, Tullar & Cooper, P.C.

[57] ABSTRACT

The present invention provides a heat insulated vessel (A) which is suitable for containing convenience food which can be cooked by hot water, or food or drink which is desired to be eaten or drunk while it is hot, and also a method of producing the vessel. The heat insulated vessel (A) of the present invention is made of a formed product of a foamed synthetic resin. An annular flange is continuous with an opening edge of a bottomed cylindrical portion, and a curled portion which is thinner than the bottomed cylindrical portion and which has a curved section shape is continuous with the annular flange. Preferably, the thickness of the curled portion is 1.5 mm or less. In the production method of the present invention, a skirt portion of an intermediate formed product which is made of a foamed synthetic resin is made thinner than a barrel wall portion of the bottomed cylindrical portion, and the skirt portion is gradually sent in a groove which is made in a forming die and in which the width is gradually reduced, in a direction from a larger groove width to a smaller groove width, while rotating the skirt portion in the groove and heating the skirt portion, thereby forming the skirt portion into a curved section shape to make the curled portion.

9 Claims, 9 Drawing Sheets

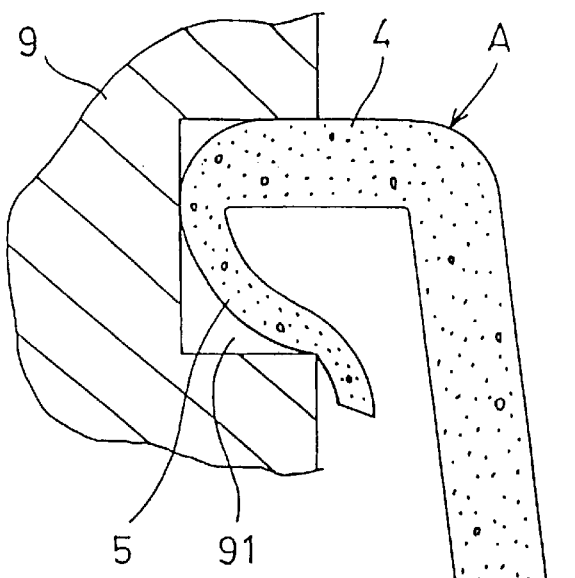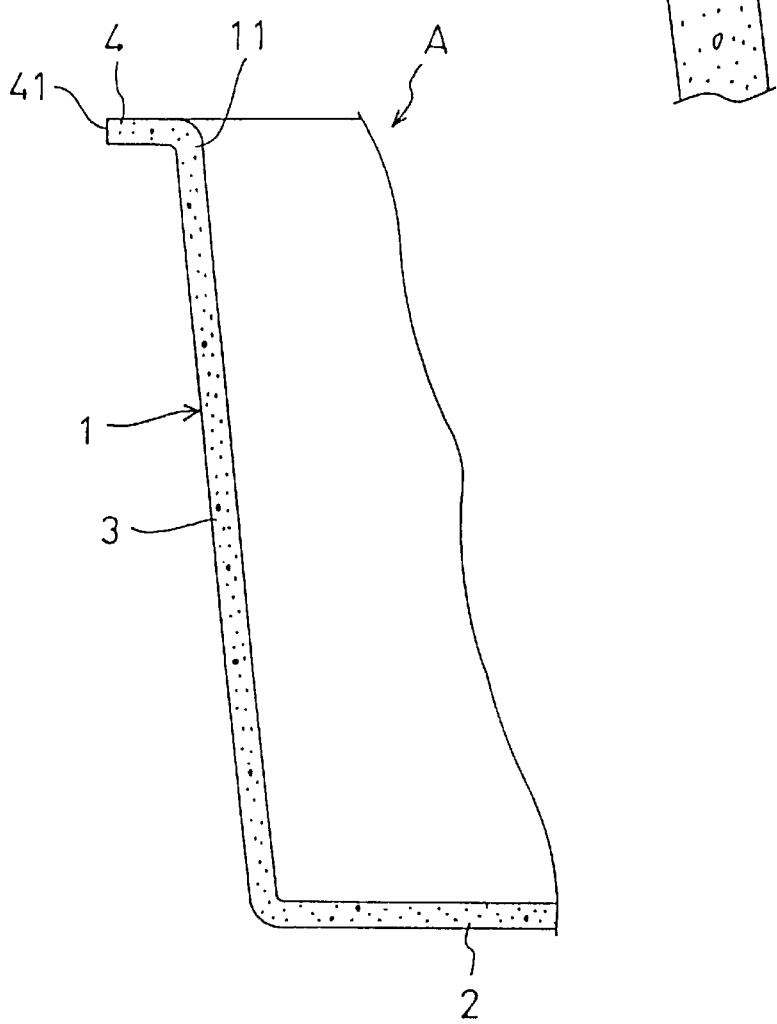

HEAT INSULATED VESSEL AND A METHOD OF PRODUCING THE SAME

TECHNICAL FIELD

The present invention relates to a heat insulated vessel which can be used as a vessel for containing convenience food such as instant noodles, and a method of producing the same, and more particularly to a heat insulated vessel which is made of a foamed synthetic resin having an excellent heat insulating property, and a method of producing the same.

BACKGROUND ART

A vessel for containing convenience food such as instant noodles or instant YAKISOBA (snack noodles) which can be cooked by pouring hot water into the vessel, or for containing food which is desired to be eaten while it is hot may be made of a formed product of a foamed synthetic resin. This is preferable because the heat insulating property inherent in the foamed synthetic resin causes the temperature of the contents to be hardly transferred to a hand holding the vessel, and the contents to be hardly cooled.

FIG. 14 shows a part of a heat insulated vessel A of the prior art which is made of a foamed synthetic resin. In the vessel, an annular flange 4 is radially outwardly projected from and continuous with an opening edge 11 of a bottomed cylindrical portion 1 in which a barrel wall portion 3 extends from a bottom wall portion 2.

Conventionally, such a heat insulated vessel A can be produced by the bead foam forming method. However, a vessel produced by the bead foam forming method has problems in that the surface roughness is large and that the production cost is high.

By contrast, a heat insulated vessel is sometimes produced from a foamed synthetic resin sheet by the vacuum forming method or the air-pressure forming method. In these methods, vessels are simultaneously formed at plural positions of a foamed synthetic resin sheet by the method described above, and thereafter the formed vessels are punched out from the foamed synthetic resin sheet so that the vessels are individually taken out. In the heat insulated vessel A which is taken out from the foamed synthetic resin sheet by punching, however, the outward end face 41 of the annular flange 4 corresponds to the cut face of a large surface roughness. Therefore, such a vessel has problems in that the end face 41 is so conspicuous that the external appearance of the heat insulated vessel A is bad-looking, and that, when the contents are eaten or drunk by putting the lips to the annular flange 4, the flange hardly hits against the lips, so that a physical disorder may be produced on the lips and, in an extreme case, the lips are cut or injured, thereby lowering the value of this product.

As discussed above, the prior art heat insulated vessel A made of a foamed synthetic resin, particularly the annular flange 4 shown in FIG. 14 is susceptible to improvement. Conventionally, the heat insulated vessel A is produced with a view to economical efficiency, size, heat insulating property, and rigidity. From this point of view, also the annular flange 4 is made as an annular flange which is very thick or has a thickness equal to that of the barrel wall portion 3 of the heat insulated vessel A. As a result, the thick annular flange 4 cannot be subjected to a forming process in which a designed shape is made, before the forming of the heat insulated vessel A and also after the forming. In the art, therefore, it seems that the annular flange 4 cannot be improved.

SUMMARY OF THE INVENTION

In view of the above-mentioned circumstances, the present invention provides a novel technique which can improve the annular flange.

It is an object of the present invention to provide a heat insulated vessel in which, although it is made of a formed product of a foamed synthetic resin, a curled portion is disposed in an opening portion, thereby causing the vessel to have an excellent external appearance and eliminating the fear that, when the lips are put to the opening edge, the lips are scalded or the lips are cut or injured by the opening edge.

It is another object of the present invention to provide a method of producing a heat insulated vessel which can produce the above-mentioned heat insulated vessel with excellent productivity and at a low cost.

The heat insulated vessel of the present invention is a heat insulated vessel which is made of a formed product of a foamed synthetic resin, and which comprises: a bottomed cylindrical portion in which a barrel wall portion extends from a bottom wall portion; an annular flange which is radially outwardly projected from and continuous with an opening edge of the bottomed cylindrical portion; and a curled portion which is continuous with the annular flange and has a curved section shape, the curled portion being thinner than the barrel wall portion of the bottomed cylindrical portion.

In this configuration, the heat insulated vessel is made of a formed product of a foamed synthetic resin. Even when the bottom wall portion is put on a hand or the barrel wall portion is held by a hand, therefore, the temperature of the hot contents is hardly transferred to the hand. Since the barrel wall portion which is to be held by a hand is thicker than the curled portion, the upper limit of the thickness of the barrel wall portion is not restricted by the thickness of the curled portion. Therefore, the barrel wall portion can be easily made thicker so that the heat insulating property is enhanced.

Since the curled portion is thinner than the barrel wall portion, the heat insulating property exerted by the curled portion is smaller than that exerted by the barrel wall portion from the point of view of only the relationships of the thickness of the curled portion. However, the curled portion is continuous with the annular flange which projects radially outwardly from and continuous with the opening edge of the barrel wall portion, and has a curved section shape. Therefore, a space which defines an air layer is made around the opening edge of the barrel wall portion by the annular flange and the curled portion. Because of the heat insulating property exerted by the air layer, the temperature of the hot contents is hardly transferred to the surface of the curled portion even when the curled portion is thin. When the contents are eaten or drunk by putting the lips to the curled portion, therefore, the lips hardly sense the hotness. Since the contents are eaten or drunk by putting the lips to the curled portion, a physical disorder is not produced and there is no danger that the lips are cut or injured.

In the heat insulated vessel of the present invention, the annular flange may have a thickness which is substantially equal to or smaller than the thickness of the barrel wall portion, or the annular flange may be thinner than the barrel wall portion. With respect to the thickness of the curled portion, the present invention includes cases in which the thickness is equal to that of the annular flange and in which the thickness is smaller than that of the annular flange. When the thickness of the curled portion is equal to that of the annular flange, there is a fear that the annular flange will buckle during the process of forming the curled portion. From the point of view of the formability of the curled portion, it is preferable to make the curled portion thinner than the annular flange.

The heat insulated vessel of the present invention may be made of a formed product of a foamed synthetic resin such as that of a foamed polystyrene resin. In this case, preferably, the thickness of the curled portion is 1.5 mm or less. When the foamed synthetic resin is curled by bending, the forming speed can be made higher as the foamed synthetic resin is thinner, and hence the forming speed can be increased. By contrast, the formability is made lower as the foamed synthetic resin is thicker. When the thickness is excessively larger, therefore, it is impossible to conduct the bending process. Preferably, the thickness of the curled portion is 1.0 mm or less. Since the curled portion has a curved section shape, a shape retention strength of a certain degree is ensured by the shape of the curled portion itself. Consequently, it is preferable to set the lower limit of the thickness of the curled portion to be 0.3 mm.

In the present invention, since the thickness of the curled portion in the case where the heat insulated vessel is made of a formed product of a foamed polystyrene resin is set to be 1.5 mm or less, formability in the process of forming the curled portion is maintained to be satisfactory, so that productivity can be easily enhanced by improving the forming accuracy or increasing the forming speed. When the thickness of the curled portion is set to be a dimension larger than 1.5 mm, formability is lowered and hence it is difficult to accurately form the curled portion by bending.

When the heat insulated vessel of the present invention is used for containing the above-mentioned convenience food or hot food, the vessel may be made a formed product of a foamed polystyrene resin, the thickness of the curled portion may be set to be 1.5 mm or less, the thickness of the barrel wall portion of the bottomed cylindrical portion may be set to be 1.8 to 3.5 mm, and the thickness of the annular flange may be set to be b 1.8 to 3.5 mm. In the heat insulated vessel, portions which are to be held by a hand mainly consist of the barrel wall portion of the bottomed cylindrical portion. In the case where the thickness of the barrel wall portion is set to be 1.8 to 3.5 mm or larger than that of the curled portion, even when the barrel wall portion is held by a hand, therefore, the heat of the contents of the vessel is not largely transferred to the hand. When the thickness of the barrel wall portion is smaller than 1.8 mm, the strength and the heat insulating property which are required in the barrel wall portion tend to be excessively lowered. By contrast, when the thickness is larger than 3.5 mm, the forming material is wastefully consumed and hence such a thickness is not preferable.

In the heat insulated vessel of the present invention, when it is requested to thermally weld a paper lid lined with aluminum to the opening edge of the bottomed cylindrical portion so as to close the opening, it is preferable to make an annular flat portion on the outer surface of the annular flange. In this configuration, when the lid is thermally welded to the flat portion of the annular flange, the welding area is enlarged so that sealing performance is surely maintained.

According to the method of producing a heat insulated vessel of the present invention, a skirt portion of an intermediate formed product of a foamed synthetic resin in which an annular flange projects radially outwardly from and continuous with an opening edge of a bottomed cylindrical portion, a barrel wall portion is extended from a bottom wall portion, of the bottomed cylindrical portion, and the skirt portion extends from the annular flange in an axial direction and is thinner than the barrel wall portion of the bottomed cylindrical portion, is gradually sent in a groove which is made in a forming die and in which a width is gradually reduced, in a direction from a larger groove width to a smaller groove width, while rotating the skirt portion in the groove and heating the skirt portion, thereby forming the skirt portion into a curved section shape to make a curled portion. The forming die may be a flat plate in which a groove the width of which is gradually reduced is made. In order to reduce the installation space of the forming die and increase productivity, however, the forming die is preferably configured by a roll member having a spiral groove.

In the method of producing a heat insulated vessel of the present invention, preferably, the thickness of the skirt portion is 1.5 mm or less. When the skirt portion has a thickness of this value, during the process of forming the skirt portion so as to have a curved section shape by rotating the skirt portion in the groove of the forming die while heating, the forming is conducted without undue strain and the skirt portion hardly cracks, so that forming accuracy is improved and the forming speed is increased. Therefore, the productivity can be easily enhanced. When the thickness of the skirt portion is larger than 1.5 mm, the formability is lowered and it is difficult to accurately form the curled portion.

The intermediate formed product of a foamed synthetic resin can be obtained with excellent productivity by passing a foamed synthetic resin sheet through means for forming the sheet while heating it to the formable temperature. As the foamed synthetic resin sheet, a foamed polystyrene resin sheet is preferably used. In this case, preferably, the foamed polystyrene resin sheet (original sheet) has a thickness of 0.3 to 3.5 mm. In the case where a foamed polystyrene resin sheet is used as the original sheet and the intermediate formed product is formed by heating the original sheet to the formable temperature, when the original sheet is excessively thick, a restriction is imposed on the finishing in which the skirt portion of the intermediate formed product is thinned. Specifically, in order to finish the skirt portion so as to have a thickness of 1.5 mm or less as in the case of the above-mentioned intermediate formed product, it is preferable to set the thickness of the original sheet to be 3.5 mm or less from the point of view of enhancing productivity. When an original sheet of a thickness of 3.5 mm or less is used, however, there is a fear that the original sheet will be broken during the forming process. Particularly, it is difficult to conduct the deep drawing. The foamed polystyrene resin sheet preferably has a thickness of 0.3 to 1.5 mm. When the thickness is in this range, the skirt portion can be accurately finished so as to be 1.5 mm or less, the deep drawing can be accurately conducted, and productivity can be easily enhanced. In the case where the intermediate formed product is to be formed by deep drawing, the foamed polystyrene resin sheet preferably has an expansion ratio of 1.5 to 12 times.

BRIEF DESCRIPTION OF THE DRAWINGS

FIG. 13 is a diagram showing a final stage of the step of forming a skirt portion into a curled portion.

FIG. 14 is a partial section view of a heat insulated vessel according to the prior art.

DETAILED DESCRIPTION OF THE PREFERRED EMBODIMENTS

Figure 1:
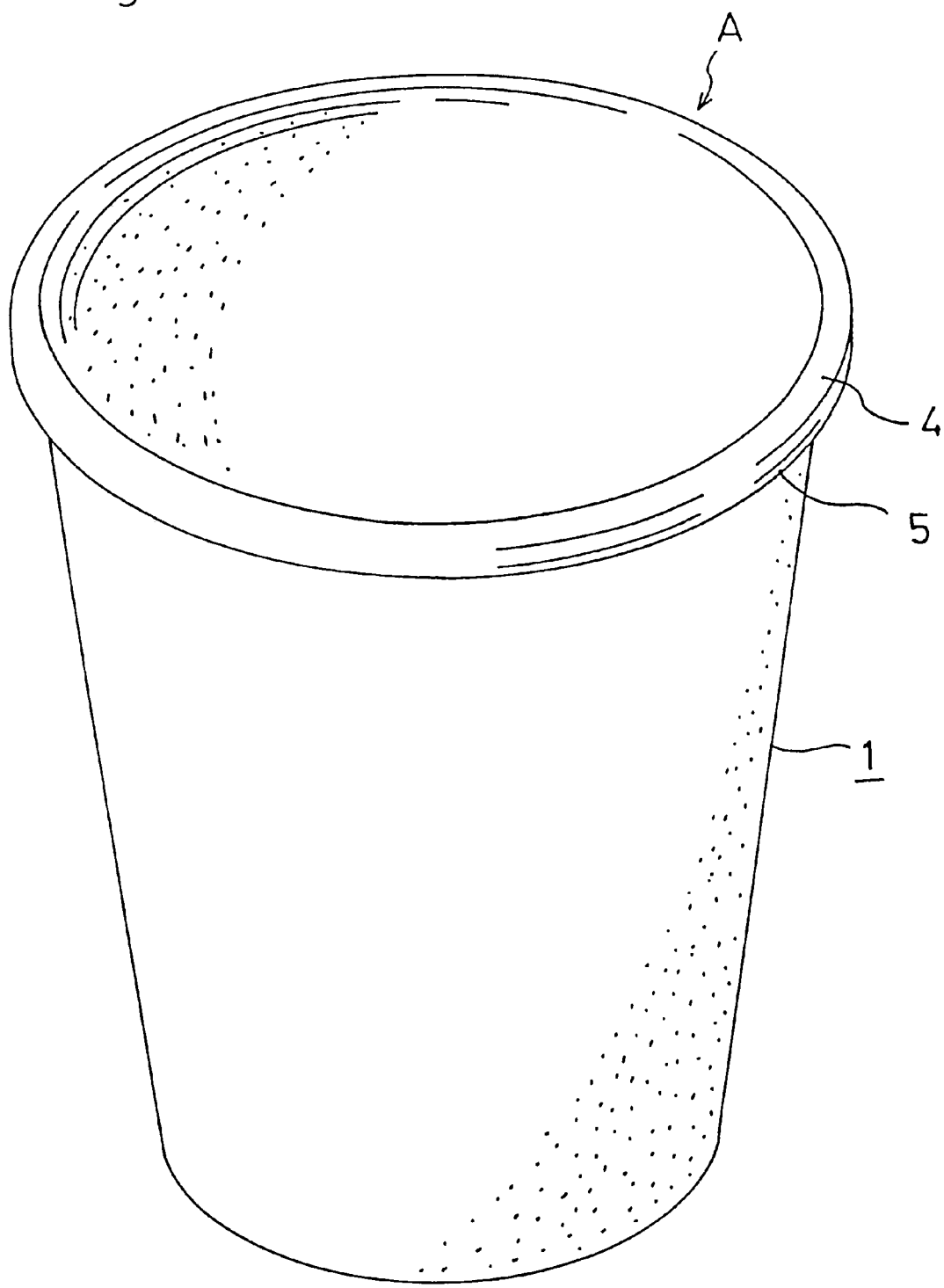
FIG. 1 is a schematic perspective view showing an example of the heat insulated vessel of the present invention.
Figure 2:
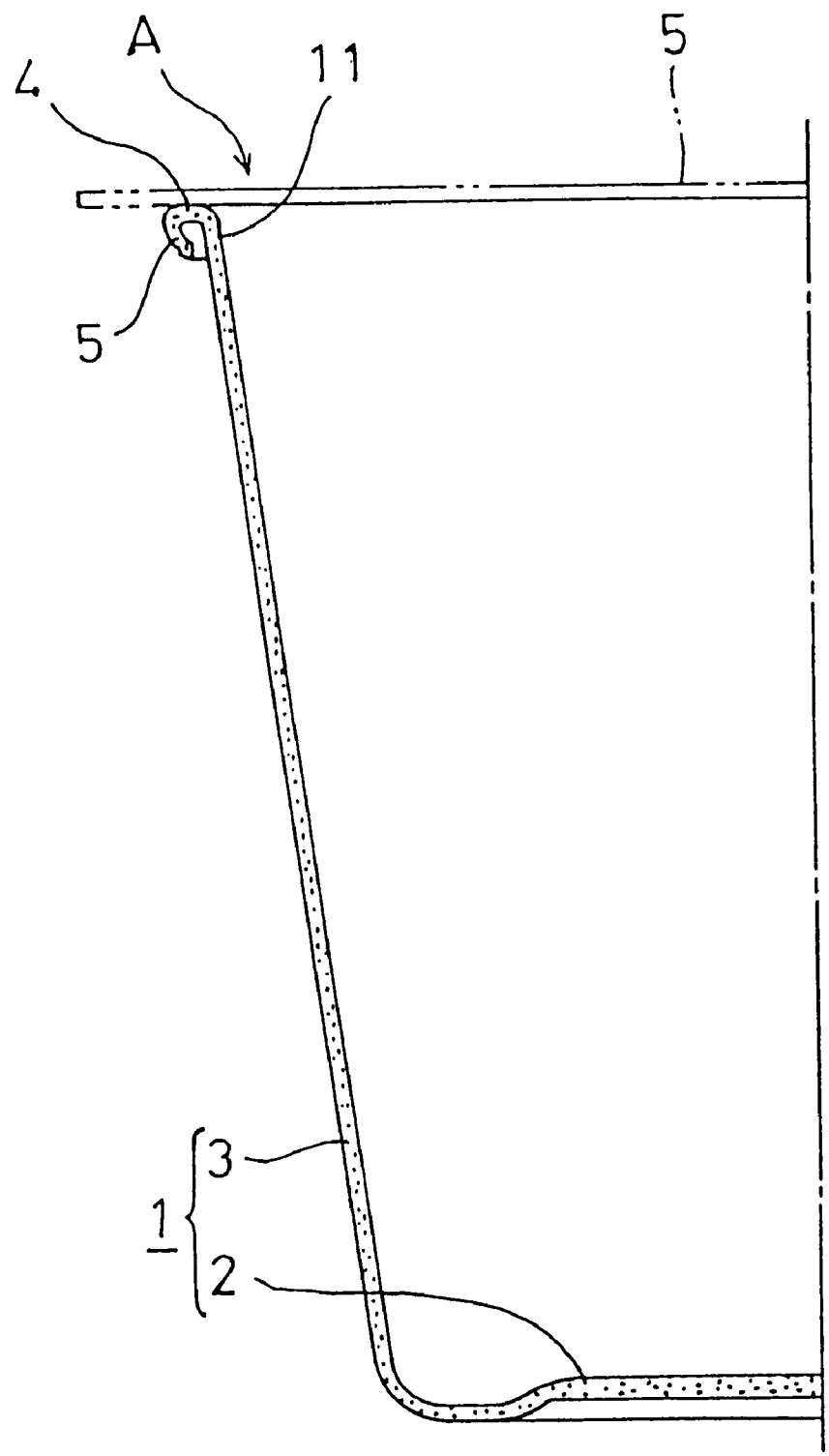
FIG. 2 is a partial section view showing the example of the heat insulated vessel of the FIG. 1.

As seen from FIGS. 1 and 2, a heat insulated vessel A of the present invention integrally has: a bottomed cylindrical portion 1 in which a barrel wall portion 3 extends from a bottom wall portion 2; an annular flange 4 which is radially outwardly projected from and continuous with an opening edge 11 of the bottomed cylindrical portion 1; and a curled portion 5 which is continuous with the annular flange 4 and has a curved section shape. The heat insulated vessel A is integrally formed by a formed product of a foamed synthetic resin, specifically, a foamed polystyrene resin. The heat insulated vessel A is beneficially used for containing convenience food such as instant noodles which can be cooked by pouring hot water into the vessel, or food or drink which is desired to be eaten or drunk while it is hot.

Figure 3:
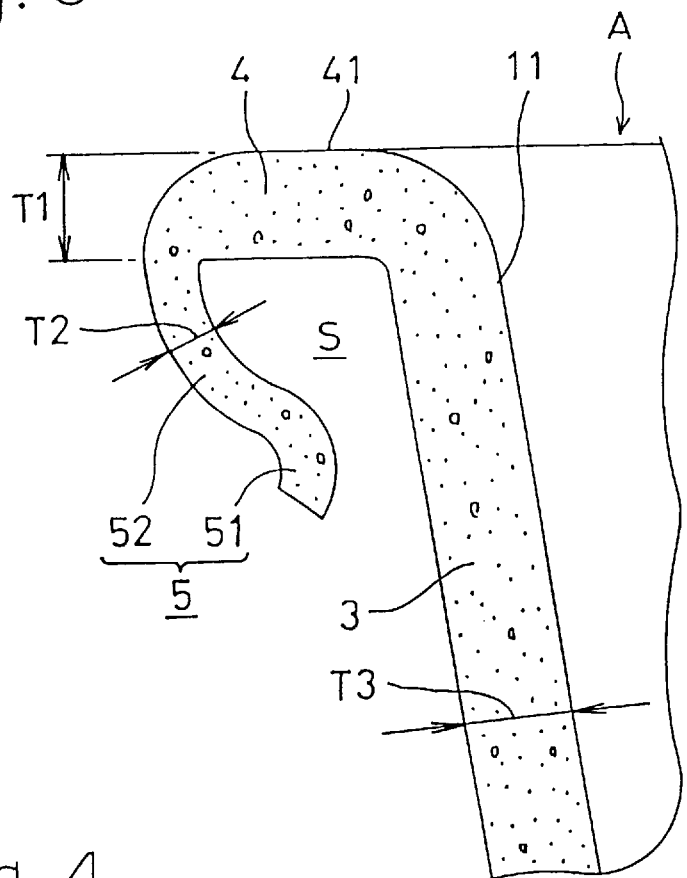
FIG. 3 is an enlarged partial section view of a curled portion of the heat insulated vessel of the present invention.
Figure 5:
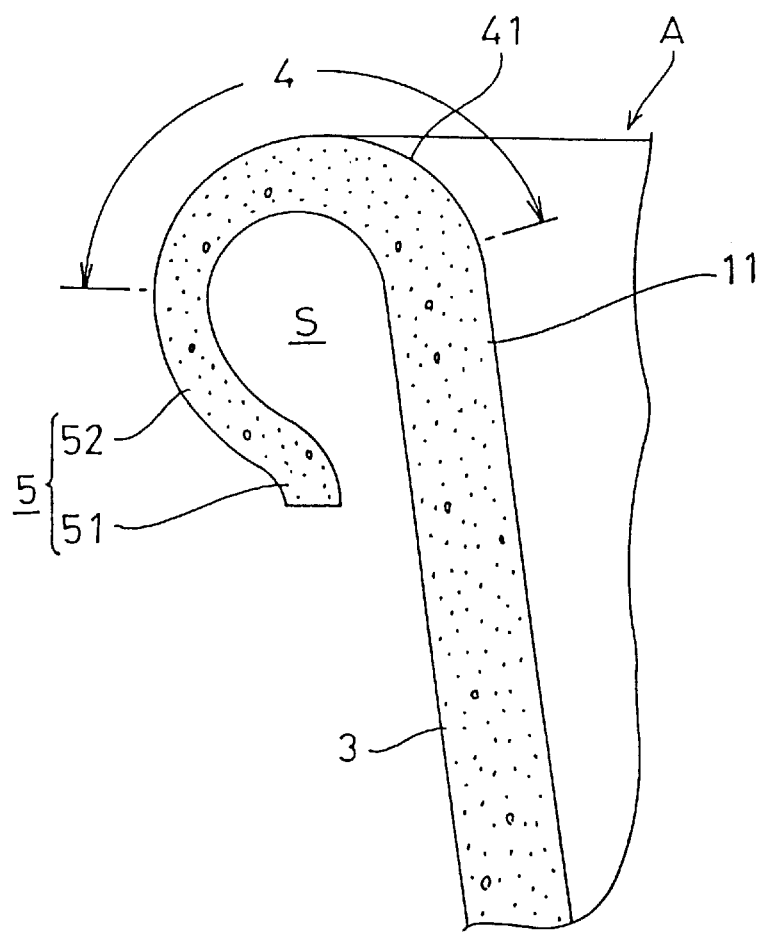
FIG. 5 is an enlarged partial section view of a curled portion of another modification of the heat insulated vessel of the present invention.

As shown in detail in FIG. 3, an annular flat portion 41 is disposed on the outer surface of the annular flange 4. The flat portion 41 is used as a fusing face to which a lid 5 indicated by a phantom line in FIG. 2 is to be thermally fused. As the lid 5, a paper lid lined with aluminum is known. When the flat portion 41 is used as a fusing face as described above, there is an advantage that the welding area is enlarged so that the sealing performance is surely maintained. The configuration in which the outer surface of the annular flange 4 is made as the flat portion 41 is not essential. For example, the annular flange 4 may be made so as to have a curved section shape as shown in FIG. 5, so that the outer surface is made as a curved face.

Figure 4:
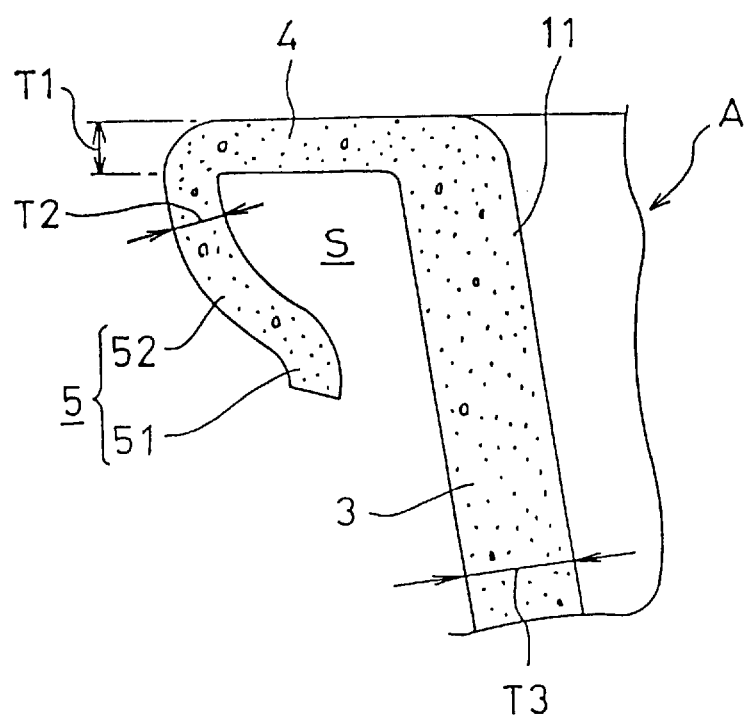
FIG. 4 is an enlarged partial section view of a curled portion of a modification of the heat insulated vessel of the present invention.

The annular flange 4 may have a thickness which is substantially equal to that of the barrel wall portion 3 as shown in FIG. 3, may be thinner than the barrel wall portion 3 as shown in FIG. 4, or may have a section shape in which the thickness of the basal portion is substantially equal to that of the barrel wall portion 3. The annular flange 4 may have a thickness which becomes gradually smaller as it moves away from the barrel wall portion 3 as shown in FIG. 5. The curled portion 5 it may be thinner than the annular flange 4 as shown in FIG. 3, or it may have a thickness which is substantially equal to that of the annular flange as shown in FIG. 4. From the point of view of formability which will be described later, it is preferable to make the curled portion thinner than the annular flange 4 as shown in FIG. 3. The curled portion 5 is made so as to have a curved section shape and inwardly enter as a whole from the outer peripheral edge of the annular flange 4. In the curled portions 5 shown in FIGS. 3 to 5, however, the end edge portion 51 is slightly curled in a direction opposite to the main portion 52. The curled portion 5 may have a shape in which the whole of the main portion 52 and the end edge portion 51 is inwardly curled.

In the heat insulated vessel A of FIG. 3, the thickness T2 of the curled portion 5 is 1.5 mm or less, the thickness T3 of the barrel wall portion 3 is 1.8 to 3.5 mm, and the thickness T1 of the annular flange 4 is 1.8 to 3.5 mm. In the heat insulated vessel A of FIG. 4, the thickness T2 of the curled portion 5 is 1.5 mm or less, the thickness T3 of barrel wall portion 3 is 1.8 to 3.5 mm, and the thickness T1 of the annular flange 4 is equal to that of the curled portion 5.

In the heat insulated vessel A described above, portions which are to be held by a hand mainly consist of the barrel wall portion 3 of the bottomed cylindrical portion 1. Consequently, the barrel wall portion 3 is naturally required to have a heat insulating property which is sufficient for impeding the transfer of heat from the hot contents to the hand, and also to have a strength at which, when the vessel is grasped by a hand, the vessel is hardly deformed. In the case where the thickness of the barrel wall portion 3 is set to be 1.8 to 3.5 mm as described above, even when the barrel wall portion 3 is grasped by a hand, the heat of the contents is not largely transferred to the hand, and, even when the barrel wall portion 3 is held by a hand, the vessel is hardly deformed. When the thickness of the barrel wall portion is smaller than 1.8 mm, the strength and the heat insulating property which are required in the barrel wall portion 3 tend to be excessively lowered. It is not impossible to set the thickness of the barrel wall portion 3 to be larger than 3.5 mm. However, such a large thickness is not preferable because it causes the forming material to be wastefully consumed.

Since the thickness of the curled portion 5 is 1.5 mm or less, the curled portion is thinner than the barrel wall portion 3. Therefore, the heat insulating property exerted by the curled portion 5 is smaller than that exerted by the barrel wall portion 3. However, a space S is formed around the opening edge 11 by the curled portion 5 and the annular flange 4. An air layer in the space S exhibits a heat insulating property. Even when the curled portion 5 is as thin as 1.5 mm or less, therefore, the temperature of the container contents is hardly transferred to the surface of the curled portion 5. When the hot contents are eaten or drunk by placing lips to the curled portion 5, therefore, the lips hardly sense the hotness.

Next, a method of producing the heat insulated vessel A will be described with reference to FIGS. 6 to 13.

Figure 6:
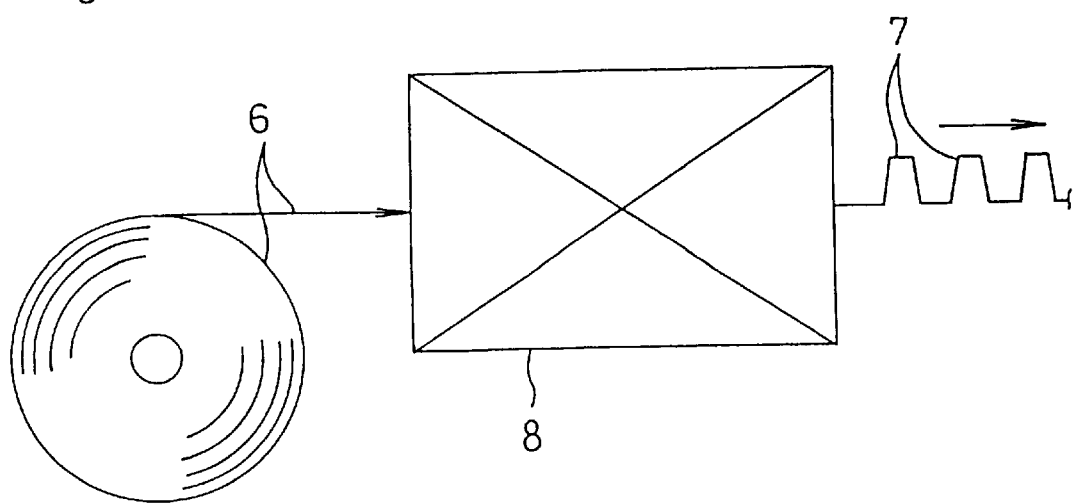
FIG. 6 is a diagram showing a step of forming an intermediate formed product in the method of producing a heat insulated vessel of the present invention.

In the production method, a foamed synthetic resin sheet, for example, a foamed polystyrene resin sheet 6 which is rolled as shown in FIG. 6 is used as the original sheet. The production method comprises steps of forming the foamed polystyrene resin sheet 6 serving as the original sheet, thereby obtaining an intermediate formed product 7 made of the foamed synthetic resin, punching out the intermediate formed product 7 from the foamed polystyrene resin sheet 6, and thereafter forming the curled portion 5.

Figure 7:
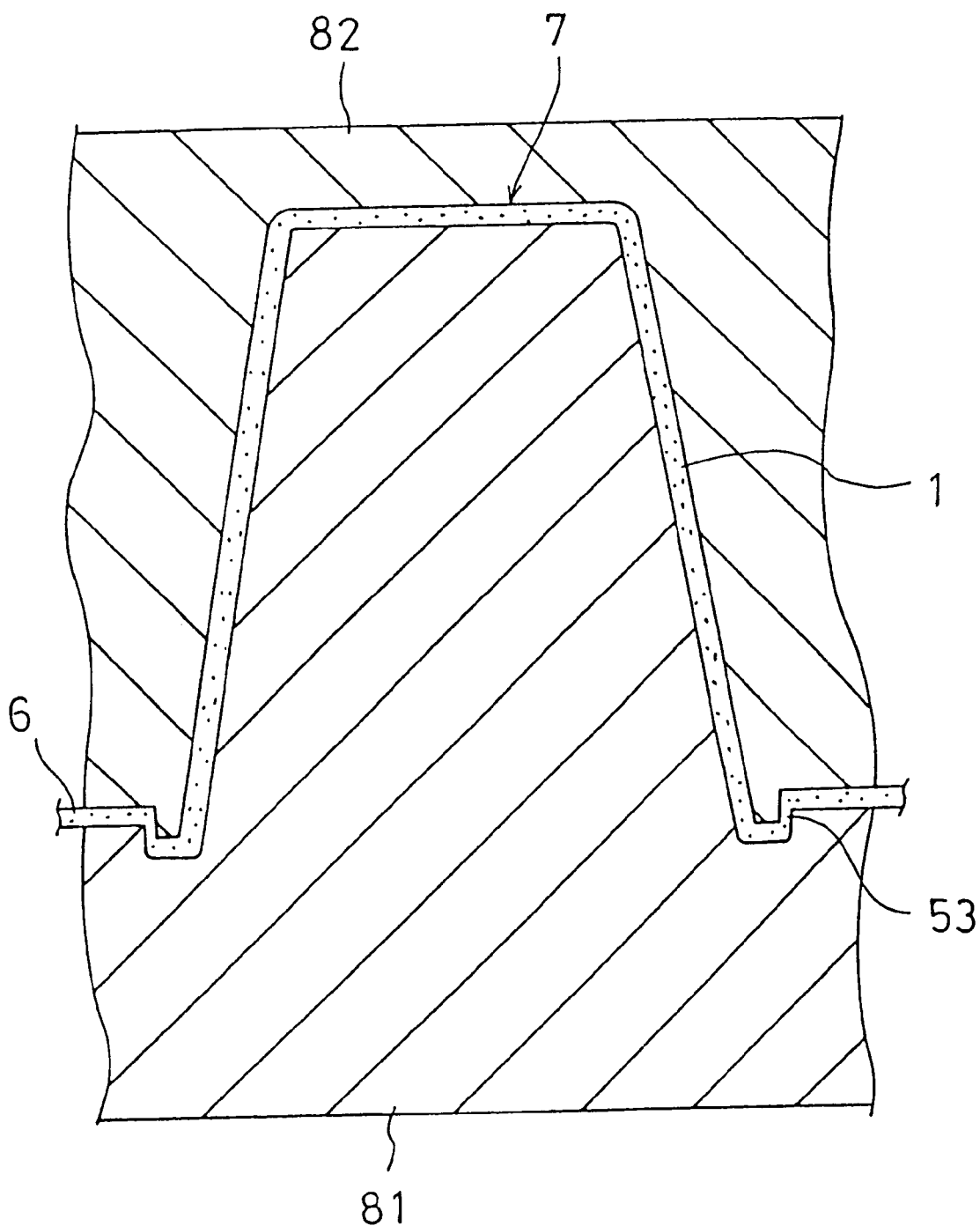
FIG. 7 is a diagram specifically showing the step of forming the intermediate formed product in the method of producing a heat insulated vessel of the present invention.

In FIG. 6, 8 designates a forming apparatus. In the forming apparatus, the foamed polystyrene resin sheet 6 is heated to the formable temperature, and the thus heated foamed polystyrene resin sheet 6 is then formed into the intermediate formed product 7 by using a forming die. As shown in FIG. 7, the forming die comprises a male die 81 and a female die 82. The foamed polystyrene resin sheet 6 is sent between the male die 81 and the female die 82, and then subjected to a deep drawing process by closing the male die 81 and the female die 82. The intermediate formed product 7 formed by this deep drawing process is then punched out into an individual article from the foamed polystyrene resin sheet 6.

Figure 8:
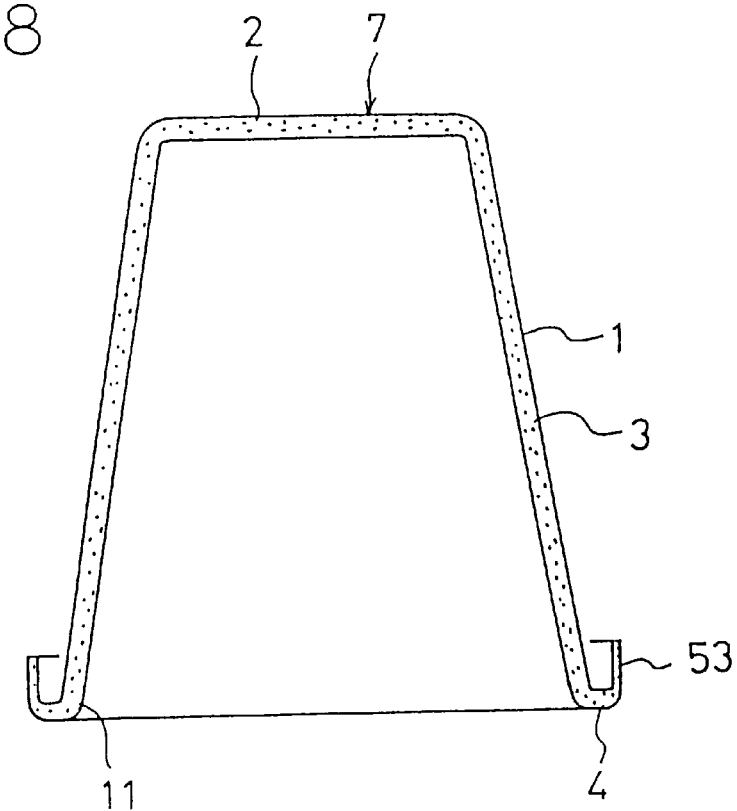
FIG. 8 is a schematic section view of the intermediate formed product.
Figure 9:
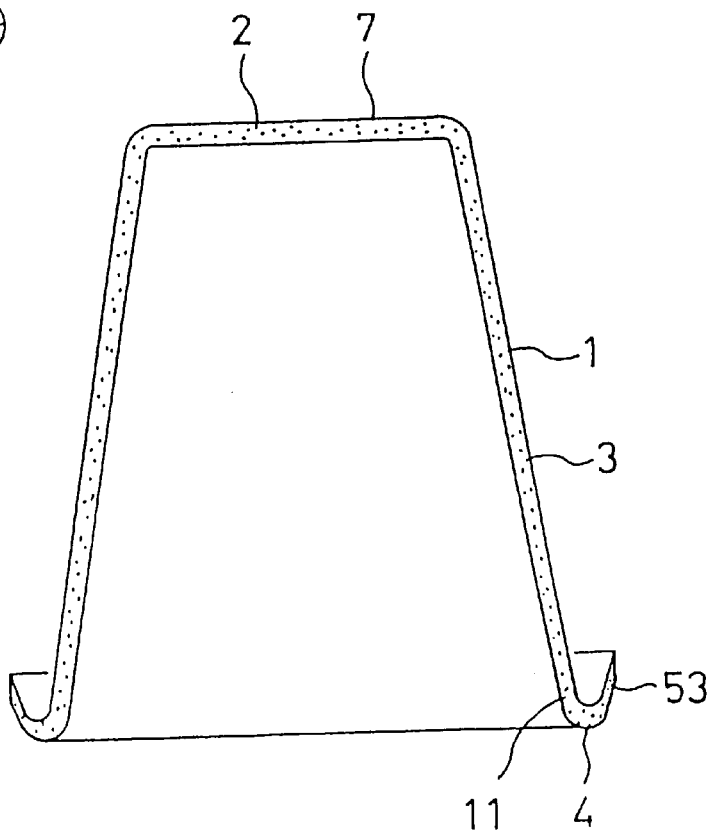
FIG. 9 is a schematic section view of an intermediate formed product according to a modification of the present invention.

FIG. 8 shows the intermediate formed product 7 which is made of the foamed polystyrene resin and obtained as a result of the punching process. The intermediate formed product 7 is suitable for forming the heat insulated vessel A which has been described with reference to FIG. 3. As seen from the figure, the intermediate formed product 7 comprises: the bottomed cylindrical portion 1 in which the barrel wall portion 3 extends from the bottom wall portion 2; the annular flange 4 which is radially outwardly projected from and continuous with the opening edge 11 of the bottomed cylindrical portion 1; and a skirt portion 53 which extends from the annular flange 4 in the axial direction. The skirt portion 53 is thinner than the barrel wall portion 3 of the bottomed cylindrical portion 1. FIG. 9 shows the intermediate formed product 7 which is suitable for forming the heat insulated vessel A which has been described with reference to FIG. 5. In the intermediate formed product, the annular flange 4 and the skirt portion 53 are continuous to each other in a curved manner.

Figure 10:
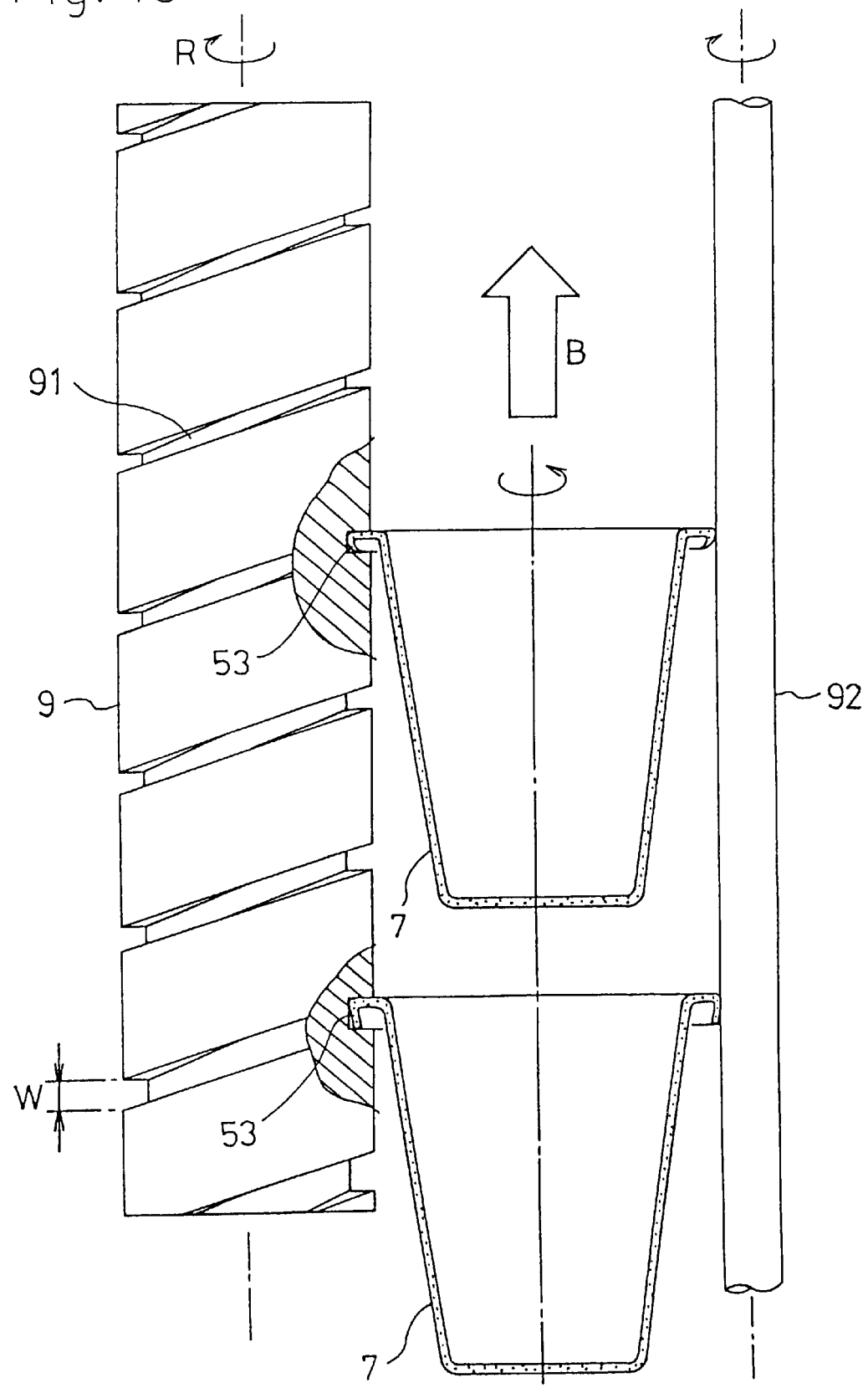
FIG. 10 is a diagram showing a step of forming a skirt portion into a curled portion.
Figure 11:
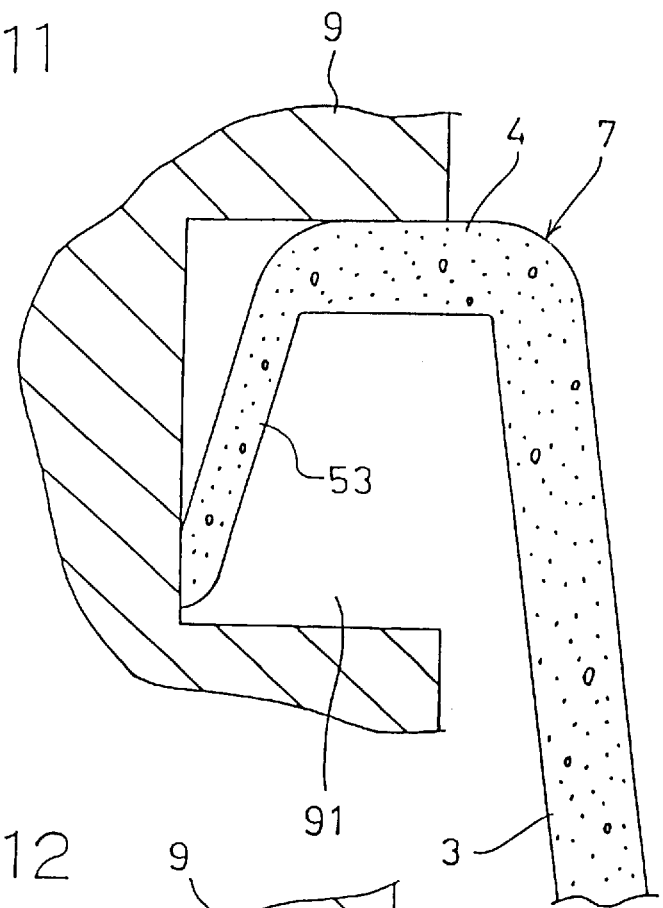
FIG. 11 is a diagram showing an initial stage of a step of forming a skirt portion into a curled portion.
Figure 12:
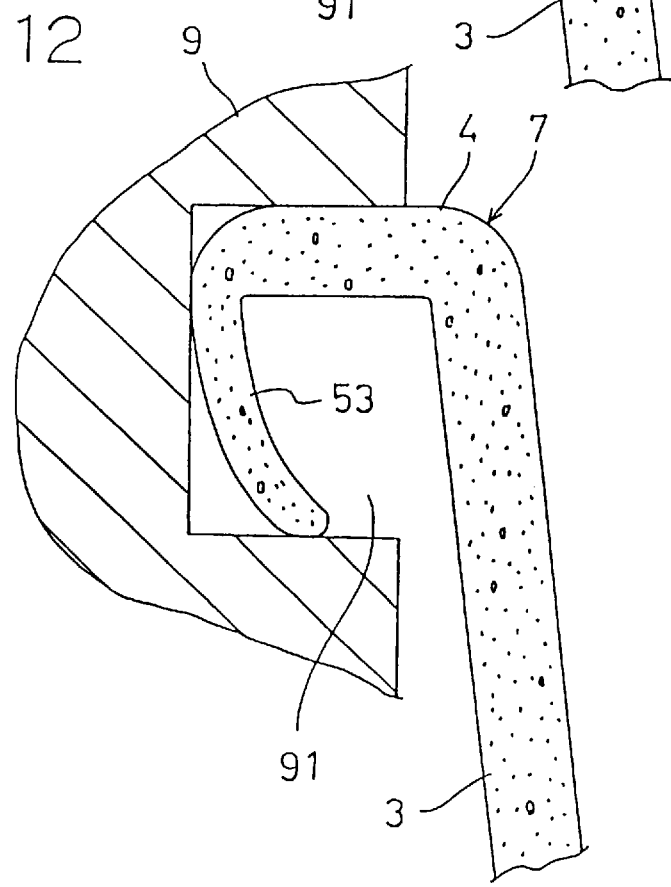
FIG. 12 is a diagram showing an intermediate stage of the step of forming a skirt portion into a curled portion.

The curled portion 5 is made by forming the skirt portion 53 of the intermediate formed product 7 which has been described with reference to FIG. 8, into a curved section shape. FIGS. 10 to 13 illustrate steps of forming the curled portion 5. In FIG. 10, 9 designates a roll member serving as the forming die. The roll member 9 comprises a spiral groove 91. In the groove 91, the width W is gradually reduced in the direction from the beginning to the end. The roll member 9 is heated to a predetermined temperature. When the intermediate formed product 7 is sent between the roll member 9 and a guide 92 disposed so as to oppose the roll member while rotating the roll member 9 in the direction of the arrow R in FIG. 10, therefore, the skirt portion 53 of the intermediate formed product 7 is introduced into the groove 91 of the roll member 9, and then gradually sent in the direction from the larger portion of the groove width W to the smaller width portion as indicated by the arrow B, while being rotated in the groove 91 by the rotation of the intermediate formed product 7 which follows that of the roll member 9, and while being heated. During this process, the skirt portion 53 is formed so as to have a curved section shape, and finally into the curled portion 5. FIG. 11 shows an initial stage in which the skirt portion 53 is introduced into the groove 91 of the roll member 9, and FIG. 12 shows an intermediate stage in which the skirt portion 53 is sent in the groove 91 of the roll member 9 in the direction from the larger portion of the groove width W to the smaller width portion. In the intermediate stage, the skirt portion 53 is slightly bent in a curved manner. FIG. 13 shows a final stage in which the skirt portion 53 is sent in the groove 91 of the roll member 9 in the direction from the larger portion of the groove width W to the smaller width portion. In the final stage, the curled portion 5 is formed into the desired shape.

When the above-described production method is employed, preferably, the foamed polystyrene resin sheet 6 has a thickness of 0.3 to 3.5 mm. When the foamed polystyrene resin sheet 6 is excessively thick, the skirt portion 53 of the intermediate formed product 7 cannot be finished so as to be thin.

As described above, the thickness of the curled portion 5 of the heat insulated vessel A described with reference to FIGS. 1 and 2 is preferably 1.5 mm or less. Therefore, also the skirt portion 53 is required to be finished so as to have a thickness of 1.5 mm or less. When the skirt portion 53 of the intermediate formed product 7 is to be curled as described in conjunction with FIGS. 10 to 13, formability is higher as the skirt portion 53 is thinner, and hence the forming speed can be made higher. By contrast, formability is lower as the skirt portion 53 is thicker. In order to finish the skirt portion 53 so as to have a thickness of 1.5 mm or less, the thickness of 3.5 mm or less in the foamed polystyrene resin sheet 6 is beneficial to enhance productivity. When the foamed polystyrene resin sheet 6 of a thickness of 3.5 mm or less is used, however, there is a fear that the foamed polystyrene resin sheet 6 is broken during the deep drawing process described with reference to FIG. 7. Preferably, the foamed polystyrene resin sheet 6 has an expansion ratio of 1.5 to 12 times.

The heat insulated vessel of the present invention is made of a formed product of a foamed synthetic resin, and the temperature of the contents of the vessel is hardly transferred to a hand holding the vessel. Therefore, the heat insulated vessel is beneficially used for containing convenience food which can be cooked by hot water, or food or drink which is desired to be eaten or drunk while it is hot. The curled portion is made in the opening edge to which lips are to be placed, and the space is formed in a vicinity of the opening edge by the curled portion. When the lips are placed on to the curled portion in order to eat or drink the contents, therefore, there is no danger that the lips are scalded. Since the lips are placed on the curled portion, a physical disorder is not produced, and the lips are prevented from being cut or injured.

According to the method of producing a heat insulated vessel of the present invention, the heat insulated vessel having a thickness which is sufficient for preventing a hand holding the vessel from sensing hotness can be integrally provided with the curled portion with superior accuracy and excellent productivity by a forming process.

I claim:

1. A heat insulated vessel which is made of a formed product of a foamed synthetic resin, comprising: a cylindrical bottom wall portion; a barrel wall portion extending from said bottom wall portion, said barrel wall portion defining an opening edge; an annular flange which projects radially outwardly from and is continuous with said opening edge of said barrel wall portion; and a curled portion which is continuous with said annular flange and has a curved section shape, said curled portion being thinner than said barrel wall portion, wherein said annular flange has an annular flat portion on an outer surface thereof.

2. A heat insulated vessel which is made of a formed product of a foamed synthetic resin, comprising: a cylindrical bottom wall portion; a barrel wall portion extending from said bottom wall portion, said barrel wall portion defining an opening edge; an annular flange which projects radially outwardly from and is continuous with said opening edge of said barrel wall portion; and a curled portion which is continuous with said annular flange and has a curved section shape, said curled portion being thinner than said barrel wall portion, wherein said curled portion is thinner than said annular flange and 1.5 mm or less, said annular flange is not thicker than said barrel wall portion, and said formed product is a formed product of a foamed polystyrene resin.

3. A heat insulated vessel which is made of a formed product of a foamed synthetic resin, comprising: a cylindrical bottom wall portion; a barrel wall portion extending from said bottom wall portion, said barrel wall portion defining an opening edge; an annular flange which projects radially outwardly from and is continuous with said opening edge of said barrel wall portion; and a curled portion which is continuous with said annular flange and has a curved section shape, said curled portion being thinner than said barrel wall portion, wherein said curled portion is thinner than said annular flange and 1.5 mm or less, said annular flange is not thicker than said barrel wall portion and 1.8 to 3.5 mm for both said annular flange and said barrel wall portion, and said formed product is a formed product of a foamed polystyrene resin.

4. A method of producing a heat insulated vessel, comprising the steps of: forming an intermediate formed product of a foamed synthetic resin having a cylindrical bottom wall portion, a barrel wall portion extending from said bottom wall portion an annular flange which projects radially outwardly from and is continuous with said opening edge, and a skirt portion which extends from said annular flange in an axial direction, forming said skirt portion thinner than said barrel wall portion; forming a groove in a forming die in which a width is gradually reduced, in a direction from a larger groove width to a smaller groove width, while rotating said skirt portion in said groove; and heating said skirt portion, thereby forming said skirt portion into a curved section shape to form a curled portion.

5. A method of producing a heat insulated vessel according to claim 4, wherein said forming die is configured by a roll member having a spiral groove.

6. A method of producing a heat insulated vessel according to claim 4, wherein the thickness of said skirt portion is 1.5 mm or less.

7. A method of producing a heat insulated vessel according to claim 4, wherein said intermediate formed product is obtained by heating a foamed synthetic resin sheet to a formable temperature and forming said sheet.

8. A method of producing a heat insulated vessel according to claim 7, wherein said foamed synthetic resin sheet is a foamed polystyrene resin sheet.

9. A method of producing a heat insulated vessel according to claim 8, wherein said foamed polystyrene resin sheet has a thickness of 0.3 to 3.5 mm.

* * * * *